(12) United States Patent
Kato et al.

(10) Patent No.: US 9,032,926 B2
(45) Date of Patent: *May 19, 2015

(54) TIMING CHAIN DRIVE DEVICE

(75) Inventors: Akio Kato, Iwata (JP); Takahiro Yamashita, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,896

(22) PCT Filed: Feb. 22, 2012

(86) PCT No.: PCT/JP2012/054208
§ 371 (c)(1),
(2), (4) Date: Aug. 6, 2013

(87) PCT Pub. No.: WO2012/115126
PCT Pub. Date: Aug. 30, 2012

(65) Prior Publication Data
US 2013/0312685 A1 Nov. 28, 2013

(30) Foreign Application Priority Data

Feb. 23, 2011 (JP) ................................ 2011-037504

(51) Int. Cl.
*F01L 1/02* (2006.01)
*F16H 7/20* (2006.01)
(Continued)

(52) U.S. Cl.
CPC . *F01L 1/022* (2013.01); *F16H 7/20* (2013.01); *F16H 7/18* (2013.01); *F16H 2007/0872* (2013.01)

(58) Field of Classification Search
CPC .............. F01L 1/022; F16H 7/18; F16H 7/20; F16H 2007/0842

USPC ........................................... 123/90.31, 90.27
See application file for complete search history.

(56) References Cited

U.S. PATENT DOCUMENTS 6,189,639 B1 2/2001 Fuse et al.
2006/0266493 A1 11/2006 Yoshida et al.
(Continued)

FOREIGN PATENT DOCUMENTS

JP 4-262154 9/1992
JP 9-236157 9/1997
(Continued)

OTHER PUBLICATIONS

International Preliminary Report on Patentability and Written Opinion of the International Searching Authority issued Sep. 6, 2013 in International (PCT) Application No. PCT/JP2012/054208.
International Search Report issued Apr. 3, 2012 in International (PCT) Application No. PCT/JP2012/054208.

*Primary Examiner* — Ching Chang
(74) *Attorney, Agent, or Firm* — Wenderoth, Lind & Ponack, L.L.P.

(57) ABSTRACT

The present invention provides a timing chain drive device which has high mechanical strength of the timing chain contact surface and small sliding resistance, and which, even when being brought into contact with a timing chain running at high speed, is difficult to wear. A first chain guide and a second chain guide, which give tension to a timing chain so as to prevent the timing chain from being slackened, are arranged, and a plurality of rollers, each of which is supported by a rolling element, are arrayed in each of the first chain guide and the second chain guide so as to be brought into contact with the timing chain.

5 Claims, 5 Drawing Sheets

(51) Int. Cl.
*F16H 7/18* (2006.01)
*F16H 7/08* (2006.01)

(56) References Cited

U.S. PATENT DOCUMENTS

2009/0143177 A1* 6/2009 Nakano et al.
2011/0294612 A1 12/2011 Kato

FOREIGN PATENT DOCUMENTS

| JP | 11-20770 | 1/1999 |
| JP | 2006-329251 | 12/2006 |
| JP | 2007-270628 | 10/2007 |
| JP | 2010-180900 | 8/2010 |
| WO | WO 2010090139 A1 * | 8/2010 |

* cited by examiner

TIMING CHAIN DRIVE DEVICE

TECHNICAL FIELD

The invention relates to a timing chain drive device which gives tension to a timing chain of an engine valve drive system so as to prevent the timing chain from being slackened.

BACKGROUND ART

A timing chain drive device is provided with chain guides which are brought into contact with middle portions of a timing chain endlessly provided around drive and driven sprockets and running at high speed, and is configured to press at least one of the chain guides against the timing chain in the direction substantially perpendicular to the running direction of the timing chain, and to thereby apply tension to the timing chain so as to prevent the timing chain from being slacked.

The chain guide is configured to guide the chain while being in contact with the chain, and hence sliding resistance is generated due to friction between the chain guide and the timing chain, causing a problem of an increased noise and mechanical loss.

Known techniques for suppressing the noise and mechanical loss of the chain guide include those described in Patent Literature 1 and Patent Literature 2. The chain guides described in Patent Literature 1 and Patent Literature 2 are formed in a curved shape along the running direction of the timing chain, in which rollers are arranged at a sliding-surface portion which is brought into contact with the timing chain, and the rollers are rolled by being pressed against the timing chain running at high speed, and thereby the sliding resistance is reduced.

CITATION LIST

Patent Literature

Patent Literature 1: Japanese Patent Laid-Open No. H09-236157 A
Patent Literature 2: Japanese Patent Laid-Open No. 2010-180900 A

SUMMARY OF INVENTION

Technical Problem

Meanwhile, in the chain guides described in the above literature, the timing chain and the roller are brought into contact with each other with strong frictional force. Therefore, it is necessary to increase the mechanical strength of the roller which is brought into contact with the timing chain, and also it is necessary to reduce the sliding resistance. Since the timing chain is made of iron, the wear of the roller which is brought into contact with the chain may pose a problem, and hence high rigidity is required especially for the roller. Further, in order to further reduce torque, there is an object of reducing torque not only of the chain guide which gives tension to the timing chain, but also of the chain guide which guides the timing chain so as to prevent the timing chain from being slackened.

In order to solve the above-described problems, an object of the present invention is to provide a timing chain drive device using a chain guide which has high mechanical strength of the timing chain contact surface and small sliding resistance, and which, even when being brought into contact with the timing chain running at high speed, is difficult to wear.

Solution to Problem

In order to solve the above-described problems, a tensioner drive device for a timing chain according to the present invention includes: a crank sprocket which is connected to a crankshaft; a cam sprocket which is connected to a cam shaft; a timing chain which is endlessly wound around the crank sprocket and the cam sprocket; a first chain guide which includes a plurality of rollers each supported by a rolling element and which gives tension to the timing chain by using a pressing device; and a second chain guide which includes a plurality of rollers each supported by a rolling element and which guides the stretched side of the timing chain.

Each of the first chain guide and the second chain guide is composed of the plurality of rollers which are brought into contact with the endlessly connected timing chain, and mutually facing side plate members which respectively support opposite ends of a support shaft of each of the plurality of rollers and which are provided along the running direction of the timing chain, the roller being composed of a roller bearing having a steel outer ring which is provided on the outer peripheral surface of the support shaft and which is brought into contact with the timing chain.

Note that in the present invention, a concept is used in which the roller bearing includes the needle roller and the cylindrical roller.

As the roller bearing, it is possible to use a roller bearing composed of a steel outer ring having inward-extending flange sections at opposite ends thereof, and a roller provided with a retainer and incorporated in the outer ring.

The steel outer ring is formed by press-forming but may also be formed by cut-forming.

As for the hardness of the outer ring, it is preferred that an outer ring having hardness higher than the hardness of the timing chain is used so as to make it difficult for the outer ring to wear even when the outer ring is brought into contact with the timing chain running at high speed.

It is desirable that the outer ring has a generating line shape of a barrel shape or a straight shape in order to avoid local high surface pressure due to point contact with the timing chain.

It is preferred that minute depressions and projections are formed on the surface of the outer ring, in order to improve the retaining performance of lubricating oil.

Further, the surface of the outer ring may be subjected to nitriding treatment, so that the mechanical strength of the outer ring is improved.

It is desirable that the roundness of the outer ring is 20 µm or less, in order to reduce vibration and to achieve silence.

Each of the first chain guide and the second chain guide is arranged at a middle portion of the endlessly connected chain, the first chain guide is configured to have one end side supported by a rotary shaft and the other end side rocked by the pressing device to give tension to the timing chain, and the second chain guide is configured to be fixed at opposite ends and to be pressed to the stretched side of the timing chain in such a manner that the tensioner drive device of the timing chain can have excellent performance and low mechanical loss.

Advantageous Effects of Invention

The timing chain drive device according to the present invention allows a plurality of rollers, each supported by a rolling element, to be brought into contact with the timing chain to give tension to the timing chain. The device therefore has low mechanical loss and is difficult to wear even when being brought into contact with the timing chain running at high speed.

DESCRIPTION OF EMBODIMENTS

Figure 1:
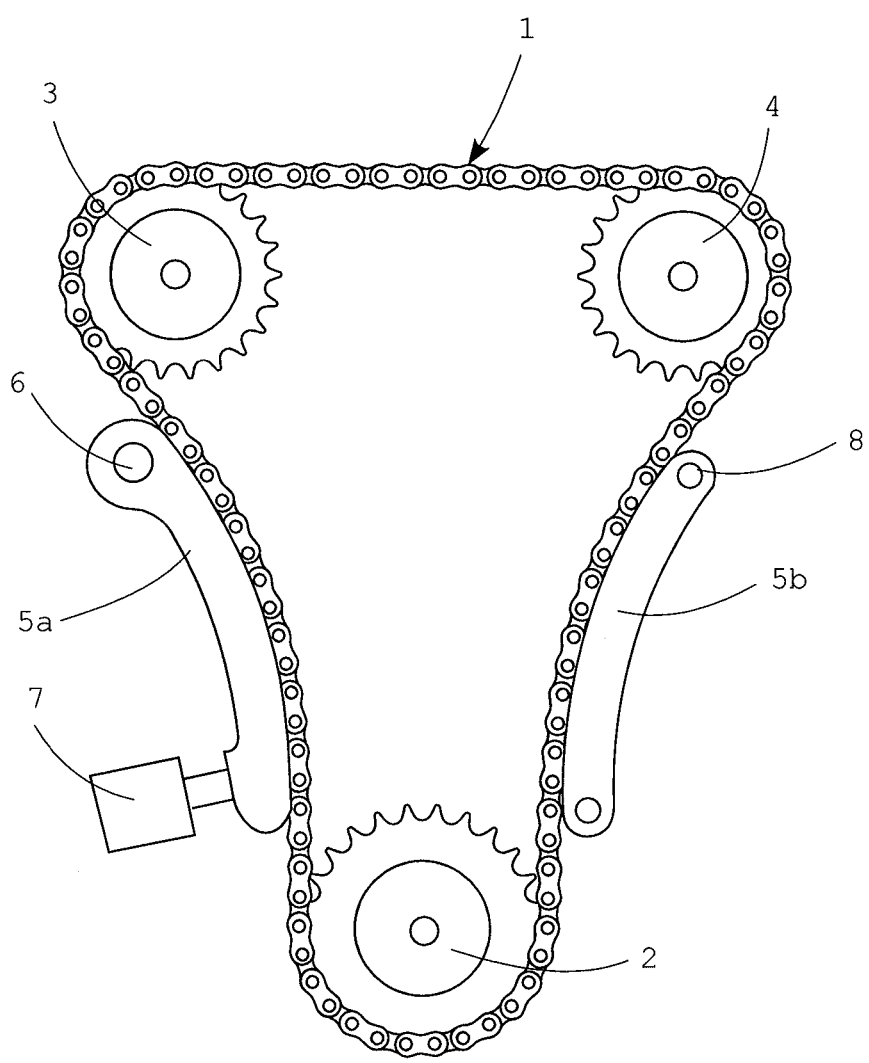
FIG. 1 is a front view showing an example of a timing chain drive device according to the present invention.

Embodiments according to the present invention will be described in detail with reference to the accompanying drawings. Note that components, which are the same or equivalent to each other, are denoted by the same reference numeral or character in the drawings, and the description thereof is not repeated to avoid duplication of description.

As shown in FIG. 1, a timing chain 1 is endlessly wound around a crank sprocket 2 attached to a crankshaft, a first cam sprocket 3 attached to a first cam shaft of a valve train, and a second cam sprocket 4 attached to a second cam shaft.

A first chain guide 5a and a second chain guide 5b are respectively arranged on the timing chain 1 between the crank sprocket 2 and the first cam sprocket 3, and on the timing chain 1 between the crank sprocket 2 and the second cam sprocket 4 so as to prevent the timing chain 1 from being slackened.

The first chain guide 5a is configured such that one longitudinal end side thereof is supported by a rotary shaft 6 so as to be rotatable with respect to an engine, and such that the other longitudinal end side thereof is rocked by a pressing device 7 so as to give tension to the timing chain 1.

The second chain guide 5b, whose opposite longitudinal ends are fixed by mounting shafts 8 with respect to the engine, guides the tensioned timing chain 1 so that the timing chain 1 is not slackened.

The first chain guide 5a and the second chain guide 5b are different from each other only in that, while the first chain guide 5a is rocked by the pressing device 7 with respect to the engine, the second chain guide 5b is not rocked and fixed with respect to the engine, and hence have the same basic structure for guiding the timing chain 1. Therefore, in the following description, the first chain guide 5a and the second chain guide 5b are collectively referred to as chain guide 5. Note that the chain guide 5 is also referred to as a chain lever.

The chain guide 5 includes a pair of side plate members 9 each formed in a curved shape along the timing chain 1, and pillar members 10 connecting the side plate members to each other.

Further, through holes 11 are respectively provided at opposite longitudinal ends of each of the side plate members 9. A shaft (not shown) is inserted into the through hole 11, so as to be fixed to, for example, an inner wall of an engine cover.

Note that, as in the first chain guide 5a in which one longitudinal end side thereof is supported by the rotary shaft so as to be rotatable with respect to the engine, and in which the other longitudinal end side thereof is rocked by the pressing device 7 to give tension to the timing chain 1, the through hole 11 of the side plate member 9 may be provided only in the one longitudinal end side.

The pressing device 7 which presses the first chain guide 5a may be a mechanical type which presses the first chain guide 5a by a spring or a screw, or a hydraulic type which hydraulically presses the first chain guide 5a.

The pair of side plate members 9 have a predetermined interval therebetween in the width direction, and the plurality of rollers 12 which are brought into contact with the timing chain 1 are arrayed between the side plate members 9. The rollers 12 may be arrayed at a uniform pitch along the side plate member 9 having a curved shape, or the pitches between the rollers 12 may be changed so that more of the rollers 12 are arranged on the entrance side in the running direction of the timing chain 1.

Support recesses 14, which support opposite ends of a support shaft 13 of the roller 12, are respectively provided in the mutually facing wall surfaces of the side plate members 9.

Figure 5:
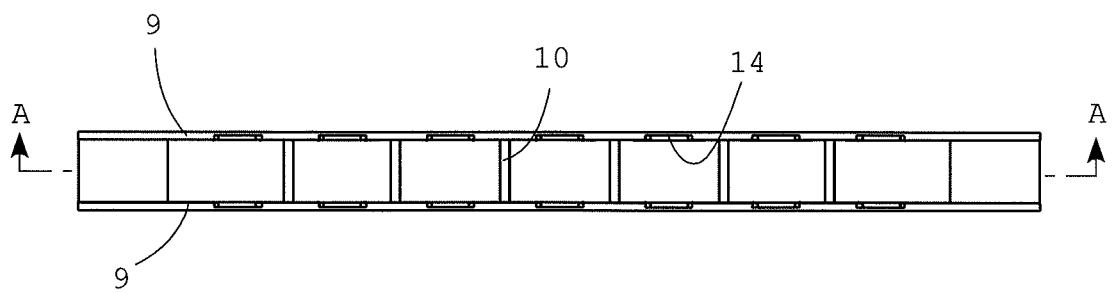
FIG. 5 is a plan view showing a state where rollers are removed from the chain guide of FIG. 2.
Figure 6:
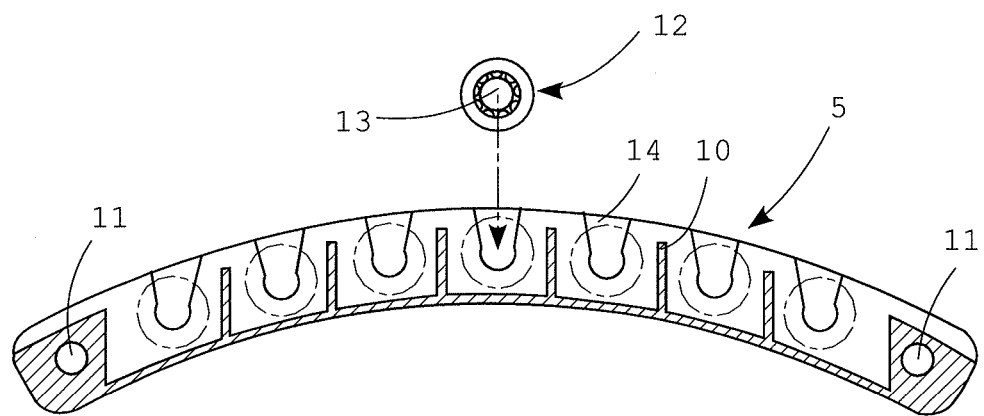
FIG. 6 is a sectional view taken in line A-A in FIG. 5.
Figure 7:
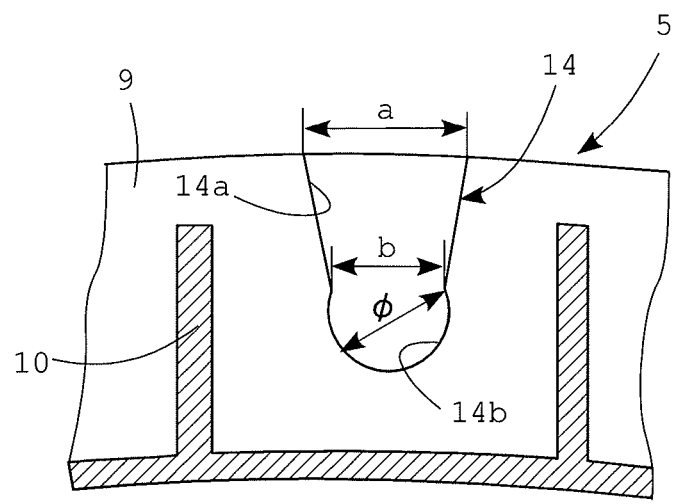
FIG. 7 is a partially enlarged view of FIG. 6.

As shown in FIG. 5, FIG. 6 and FIG. 7, each of the support recesses 14 is composed of an insertion recess 14a having an opening in the side-plate-member end surface on the side of the timing chain 1, and a fixing recess 14b connected to the insertion recess 14a and having a circular arc shape into which the end portion of the support shaft 13 is fitted. Each of opposite ends of the support shaft 13 of the roller 12 is inserted from the insertion recess 14a into the fixing recess 14b, so as to be supported by each of the side plate members 9.

As shown in FIG. 6, a plurality of the support recesses 14 are arrayed along the curved shape of the side plate member 9, and the pillar member 10 is arranged between the support recesses 14.

As shown in the enlarged view of FIG. 7, the insertion recess 14a has a wide opening section a and is formed in a tapered shape, the width of which is gradually reduced from the opening section a to the position of the fixing recess 14b. Further, the width dimension of an insertion port b, located at the position at which the insertion recess 14a is connected to the fixing recess 14b, is smaller than the diameter $\phi$ of the fixing recess 14b having the circular arc shape.

The fixing recess 14b having the circular arc shape is formed to have the diameter $\phi$ smaller than the diameter of the support shaft 13 so that the support shaft 13 is press-fitted into the fixing recess 14b.

Figure 2:
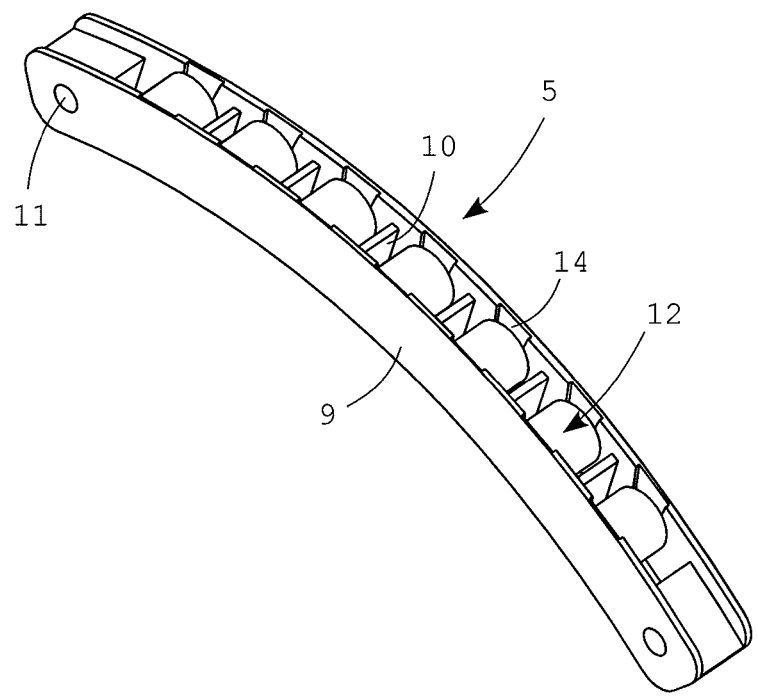
FIG. 2 is a perspective view showing an embodiment of a chain guide used for the timing chain drive device according to the present invention.
Figure 3:
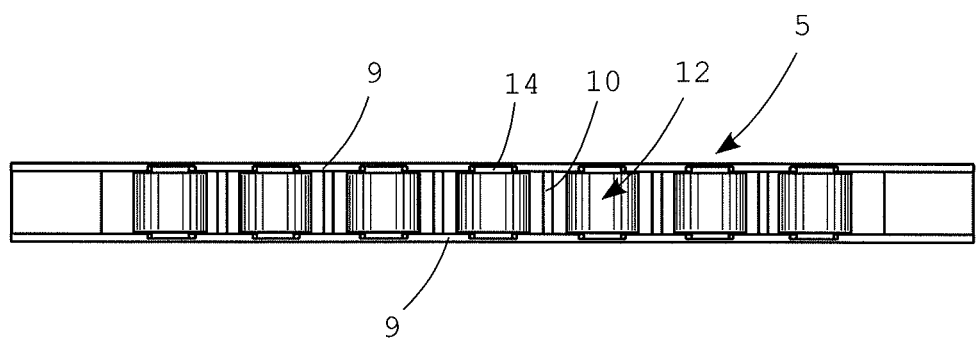
FIG. 3 is a plan view of the chain guide of FIG. 2 viewed from the chain side.
Figure 4:
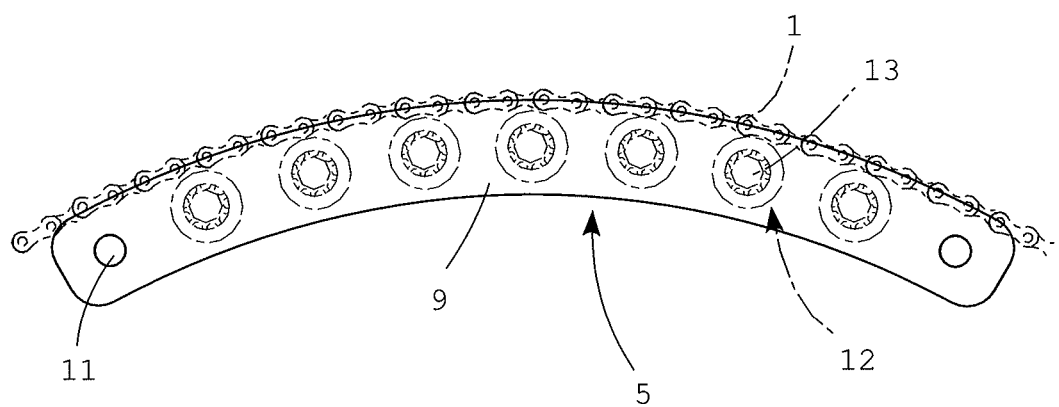
FIG. 4 is a front view of the chain guide of FIG. 2.

Further, as shown in FIG. 2 and FIG. 3, the support recess 14 is formed in the side plate member 9 in a non-penetrating state. Thereby, the shaft direction movement of the support shaft 13 inserted into the support recess 14 is regulated.

In the present embodiment, the side plate member 9 and the pillar member 10 are formed integrally by resin molding using, for example, polyamide (PA) 46 or polyamide (PA) 66 which are polymers obtained by polycondensation of diaminobutane and adipic acid. Further, it is possible to use a material obtained by combining glass fiber or carbon fiber with PA46 or PA66 in order to increase the mechanical strength.

When the side plate member 9 and the pillar member 10 are formed of resin, their weight can be reduced. Further, as the resin which forms the side plate member 9 and the pillar member 10, resin having high heat conductivity can also be used for dissipating the frictional heat.

Note that the side plate member 9 and the pillar member 10 can be formed of a material other than resin, and can be formed by, for example, casting or die-casting using light metals, such as aluminum and magnesium.

Figure 8:
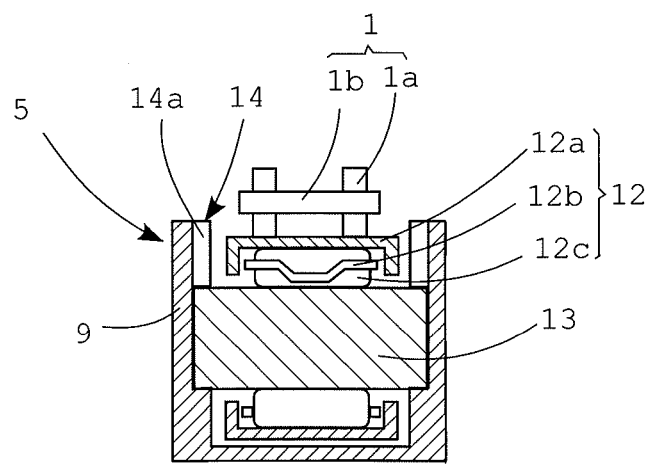
FIG. 8 is a transverse sectional view showing an embodiment of a chain guide used in a timing chain drive device of the present invention.

As shown in FIG. 8, the roller 12 is composed of the support shaft 13 and a roller bearing having a steel outer ring 12a which is brought into contact with the timing chain 1.

The roller bearing is a shell-type radial roller bearing composed of the steel outer ring 12a having inward-extending flange sections at opposite ends thereof, and a roller 12c provided with a retainer 12b and incorporated in the steel outer ring 12a. When the roller bearing is configured as the shell type, it is possible to reduce the cost and weight of the roller bearing.

The outer ring 12a, which is brought into contact with the timing chain 1, is made of steel and hence has high mechanical strength. In this way, since the outer ring 12a is made of steel, even when the timing chain 1 is made of steel, the outer ring 12a does not wear and can have sufficient mechanical strength.

Further, when the hardness of the steel outer ring 12a is higher than the hardness of the timing chain 1, the wear of the outer ring 12a can be prevented.

As a material of the outer ring 12a, a material, such as SUJ2 and SCM, which can be subjected to hardening treatment by heat treatment, is used.

In order to improve the retaining performance of lubricating oil, minute depressions and projections may be formed on the surface of the outer ring 12a.

Further, the surface of the outer ring 12a may be subjected to nitriding treatment as hardening treatment, so as to increase the mechanical strength of the outer ring 12a.

In order to avoid local surface pressure due to point contact with the timing chain 1, it is desirable that the surface of the outer ring 12a has a generating line shape of a barrel shape or a straight shape.

The outer ring 12a can be formed by press-forming or cut-forming.

When the outer ring 12a is formed by press forming, it is preferred that, after the retainer 12b and the roller 12c are incorporated into the outer ring 12a, the inward-extending flange sections are respectively formed at opposite ends of the outer ring 12a by edge bending processing, and that the outer ring 12a is then heat treated after the assembly.

In order to reduce vibration and to achieve silence, it is desirable that the roundness of the outer ring 12a is 20 μm or less.

Further, from a viewpoint of mechanical strength, it is preferred that the thickness of the outer ring 12a is 1 mm or more.

The rollers 12c are held by the retainers 12b in the circumferential direction at predetermined intervals therebetween. As the retainer 12b, a V-shaped retainer having a V-shaped pillar section is used. When the retainer 12b is used, it is possible to prevent the skewing of the roller 12c and to prevent the end surface of the roller 12c from being brought into direct contact with the flange section of the outer ring 12a. Further, it is possible to prevent the wear of the side plate member 9. Note that the roller bearing having a roller structure without using the retainer 12b may also be adopted.

Next, in order to attach the roller 12 to the side plate members 9 facing each other, the roller 12 provided with the roller bearing on the outer peripheral surface of the support shaft 13 is first prepared as shown in FIG. 6. Further, each of opposite ends of the support shaft 13 of the roller 12 is arranged to face the insertion recess 14a of the support recess formed in each of the mutually facing wall surfaces of the side plate members 9, and is then dropped into the insertion recess 14a, so as to be inserted into the fixing recess 14b from the insertion recess 14a. In the present embodiment, the opening section a is formed to be wide, and the insertion recess 14a is formed to have a tapered shape. Therefore, when the support shaft 13 is inserted, the support shaft 13 can be easily guided from the opening section a to the circular arc-shaped fixing recess 14b through the insertion port b.

In the above-described embodiment, the diameter φ of the circular arc-shaped fixing recess 14b is formed to be smaller than the diameter of the support shaft 13, and hence the support shaft 13 is press-fitted and attached to the fixing recess 14b. As a result, it is possible to suppress the rotation of the support shaft 13. In addition, the width of the insertion port b connected to the fixing recess 14b is formed to be smaller than the diameter φ of the circular arc-shaped fixing recess 14b, and hence the insertion port b performs a function of preventing the coming-off of the support shaft 13. Further, the support recess 14 is formed so as not to penetrate the side plate member 9, and hence the support shaft 13 inserted into the support recess 14 can be prevented from moving in the shaft direction.

In the state where the support shafts 13 of the roller 12 are respectively fitted into the support recesses 14 of the mutually facing side plate members 9, the outer ring 12a of the roller bearing constituting the roller 12 is lower than the end surface of the side plate member 9 as shown in FIG. 2, FIG. 4, FIG. 5 and FIG. 8. Thereby, the timing chain 1 is guided between the mutually facing wall surfaces of the side plate members 9 while being in contact with the outer ring 12a of the roller bearing constituting each of the rollers 12. As a result, the running timing chain 1 is prevented from coming off from the mutually facing wall surfaces of the side plate members 9.

Further, it is desirable that each height of the end surface of the side plate member 9 and the outer ring 12a of the roller bearing constituting the roller 12 is lower than the position of a connection pin 1b mutually connecting plates 1a constituting the timing chain 1 as shown in FIG. 8. When each height of the end surface of the side plate member 9 and the outer ring 12a is higher than the position of the connection pin 1b mutually connecting the plates 1a constituting the timing chain 1, the connection pin 1b is brought into contact with the mutually facing wall surfaces of the side plate members 9, and hence such configuration is not preferred.

Figure 9:
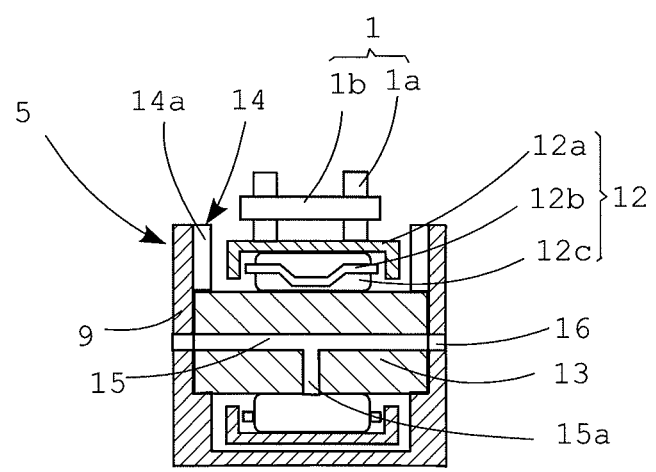
FIG. 9 is a transverse sectional view showing another embodiment of the chain guide used in a timing chain drive device of the present invention.

Next, FIG. 9 is a transverse sectional view showing a chain guide 5 according to another embodiment of the present invention. In this embodiment, components common to those of the above-described embodiments are denoted by the same reference numerals and reference characters, and the description thereof is omitted, and only different portions are described. In this embodiment, as shown in FIG. 9, an oil hole 15 is provided at the center portion of the support shaft 13, and a discharge hole 15a for discharging oil is provided at a position opposite to the timing chain 1. Further, a hole 16 connected to the oil hole 15 is provided in the side plate member 9. When the oil hole 15 is provided in this way, it is possible to supply oil to the inside of the bearing. Further, it is also possible to dissipate heat. It is preferred that the discharge hole 15a of the oil hole 15 is formed in the direction opposite to the timing chain 1 as described above. Thereby, oil is smoothly supplied to the inside of the bearing. Further, when the oil hole 15 is provided, the support shaft 13 is formed in a hollow shape, so that the weight of the chain guide 5 is reduced.

Further, in addition to the engine timing chain, the chain guide 5 according to each of the embodiments of the present invention can give tension to various driving chains, and can also reduce mechanical loss.

Further, as shown in FIG. 1, a chain tensioner drive device using the chain guide 5 according to the present invention is composed of the first chain guide 5a having one end provided with the through hole 11 into which the rotary shaft 6 is inserted, and having the other end side which is rocked by the pressing device 7, and the second chain guide 5b having opposite ends which are respectively fixed by the mounting shafts 8 with respect to the engine. With the chain tensioner drive device, the mechanical loss and weight of the engine timing chain are reduced, so that the fuel consumption rate can be improved.

Note that the timing chain 1 can be used for any of a roller chain and a silent chain.

Further, in the above embodiments, an example is shown in which the side plate member 9 and the pillar member 10 are formed integrally with each other, but each of the side plate member 9 and the pillar member 9b may be formed as a separated body.

REFERENCE SIGNS LIST

1 Timing chain
2 Crank sprocket
3 First cam sprocket
4 Second cam sprocket
5 Chain guide
5a First chain guide
5b Second chain guide
6 Rotary shaft
7 Pressing device
8 Mounting shaft
9 Side plate member
10 Pillar member
11 Through hole
12 Roller
12a Outer ring
12b Retainer
12c Roller
13 Support shaft
14 Support recess
14a Insertion recess
14b Fixing recess
15 Oil hole
15a Discharge hole
16 Hole

The invention claimed is:

1. A timing chain drive device comprising:
a crank sprocket which is connected to a crankshaft;
a cam sprocket which is connected to a cam shaft;
a timing chain which is endlessly wound around the crank sprocket and the cam sprocket;
a first chain guide which includes a plurality of rollers each supported by a rolling element and gives tension to the timing chain by using a pressing device; and
a second chain guide which includes a plurality of rollers each supported by a rolling element and guides the stretched side of the timing chain, wherein the second chain guide is configured to be fixed at opposite ends, and wherein each roller comprises a roller bearing which includes a steel outer ring.

2. The timing chain drive device according to claim 1, wherein the first chain guide is configured to have one end side supported by a rotary shaft and the other end side rocked by the pressing device to give tension to the timing chain.

3. The timing chain drive device according to claim 1, wherein in each roller bearing, the steel outer ring has inward-extending flange sections at opposite ends thereof, and the roller is provided with a retainer and incorporated in the outer ring.

4. The timing chain drive device according to claim 3, wherein the steel outer ring is formed by press-forming.

5. The timing chain drive device according to claim 3, wherein the hardness of the steel outer ring is higher than the hardness of the chain.

* * * * *